US012607127B2

(12) United States Patent
Bassery et al.

(10) Patent No.: US 12,607,127 B2
(45) Date of Patent: Apr. 21, 2026

(54) METHOD FOR MANUFACTURING A TURBOMACHINE BLADE

(71) Applicant: SAFRAN AIRCRAFT ENGINES, Paris (FR)

(72) Inventors: Josserand Jacques André Bassery, Moissy-Cramayel (FR); Ba-Phuc Tang, Moissy-Cramayel (FR); Elsa Maxime, Moissy-Cramayel (FR); Yann François Louis Baraton, Moissy-Cramayel (FR); Jérôme Salmon, Moissy-Cramayel (FR); Victor Desnoyer, Moissy-Cramayel (FR); Mickaël Mabrut, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/847,771

(22) PCT Filed: Mar. 13, 2023

(86) PCT No.: PCT/FR2023/050328
§ 371 (c)(1),
(2) Date: Sep. 17, 2024

(87) PCT Pub. No.: WO2023/175263
PCT Pub. Date: Sep. 21, 2023

(65) Prior Publication Data
US 2025/0198293 A1     Jun. 19, 2025

(30) Foreign Application Priority Data

Mar. 18, 2022    (FR) ...................................... 2202418

(51) Int. Cl.
*F01D 5/18*        (2006.01)
*B22F 3/10*        (2006.01)
(Continued)

(52) U.S. Cl.
CPC .............. *F01D 5/18* (2013.01); *B22F 3/1021* (2013.01); *B22F 3/225* (2013.01); *B22F 3/24* (2013.01);
(Continued)

(58) Field of Classification Search
CPC .......... F01D 5/18; B22F 3/1021; B22F 3/225; B22F 3/24; B22F 5/04; B22F 2003/1042;
(Continued)

(56) References Cited

U.S. PATENT DOCUMENTS 4,720,239 A * 1/1988 Owczarek ............... F01D 5/141
                                                          415/181
6,139,258 A * 10/2000 Lang, III ................ F01D 5/187
                                                          415/115
(Continued)

FOREIGN PATENT DOCUMENTS

| FR | 2 944 721 A1 | 10/2010 |
| FR | 3 037 831 A1 | 12/2016 |
| WO | 2022/234229 A1 | 11/2022 |

OTHER PUBLICATIONS

Search Report dated Oct. 26, 2022, from the French Patent Office in Application No. FR2202418.
(Continued)

*Primary Examiner* — Brian Christopher Delrue
(74) *Attorney, Agent, or Firm* — Sughrue Mion, PLLC

(57) ABSTRACT

The method for manufacturing a blade (32) of a turbomachine (100) comprises: —manufacturing a part (4) comprising an air flow path zone (10) and a layer (20) covering the zone, the layer having cavities (21) forming a periodic pattern, the manufacture taking place by injecting a mixture comprising a binder and a power; —removing a larger part of the binder from the part; —sintering the part, and —removing the layer (20) from the part to obtain the blade (32).

16 Claims, 5 Drawing Sheets

(51) Int. Cl.

| | |
|---|---|
| *B22F 3/22* | (2006.01) |
| *B22F 3/24* | (2006.01) |
| *B22F 5/04* | (2006.01) |
| *B23C 3/18* | (2006.01) |
| *B23P 15/02* | (2006.01) |

(52) U.S. Cl.
CPC ................ *B22F 5/04* (2013.01); *B23P 15/02* (2013.01); *B22F 2003/1042* (2013.01); *B22F 2003/247* (2013.01); *B22F 2998/10* (2013.01); *B22F 2999/00* (2013.01); *B23C 3/18* (2013.01); *F05D 2230/10* (2013.01); *F05D 2230/22* (2013.01)

(58) Field of Classification Search
CPC ........... B22F 2003/247; B22F 2998/10; B22F 2999/00; B23P 15/02; B23C 3/18; F05D 2230/10; F05D 2230/22
See application file for complete search history.

(56) References Cited

U.S. PATENT DOCUMENTS

| | | | | |
|---|---|---|---|---|
| 2007/0274854 | A1* | 11/2007 | Kelly | ...................... F01D 5/147 |
| | | | | 419/2 |
| 2010/0111676 | A1* | 5/2010 | Hollnbuchner | ....... F04D 29/665 |
| | | | | 415/143 |
| 2015/0093281 | A1* | 4/2015 | Campomanes | ....... C04B 35/638 |
| | | | | 419/38 |
| 2016/0319668 | A1* | 11/2016 | Paesano | .................... B63B 1/06 |
| 2016/0363005 | A1* | 12/2016 | Heinrich | .................. B22F 3/10 |
| 2017/0159442 | A1 | 6/2017 | Velazquez, Jr. et al. | |
| 2022/0258235 | A1* | 8/2022 | Sistach | ................... B22F 10/00 |
| 2024/0287905 | A1* | 8/2024 | Desnoyer | ............. C04B 35/638 |

OTHER PUBLICATIONS

International Search Report dated Jun. 19, 2023 from the French Patent Office in Application No. PCT/FR2023/050328.

* cited by examiner

METHOD FOR MANUFACTURING A TURBOMACHINE BLADE

FIELD OF THE INVENTION

The invention relates to the manufacture of turbomachine blades.

PRIOR ART

The technique of injecting metal powders (metal injection molding or MIM) for manufacturing metal products is known. This technology allows responding to the needs of high production rates while still having good repeatability and good reproducibility.

This involves injection molding starting with a mixture of metal powder and a polymer binder. This mixture, forming an aggregate called a "feedstock," is extruded, then cut into flakes or pellets to be used in an injection press.

After injection, a so-called "green" part is obtained, held together by the binder. This binder is then removed during what is called the de-binding phase, which can be carried out in different ways (by a wet method, thermally or chemically), which gives a so-called "brown" part.

This part, from which nearly all the binder has been removed, is very fragile because it is composed of almost 40% air, and is held together only by the remainder of the binder. The brown part is finally sintered, a step during which it is subjected to a temperature approaching the melting point of the powder. This temperature allows the grains to be welded together to create a solid.

A "grey" part is obtained after this step, composed only of the material of the powder and having shrunk relative to the molded volume due to the spaces left by the binder. Depending on the methods, parts can be obtained having a density of 95% to 99.5% for different applications. The part is then finished.

This technique allows creating complex shapes with excellent surface condition and fine tolerances. More economical for complex shapes, injection molding of metal powder allows the creation, in medium and large production runs, of small parts for a vast market. Forming part of the family of techniques by replication, it is very economical of raw material (for the powder portion). It does not create waste and oil is not used.

However, the shrinkage of the part mentioned above makes the application of this technique difficult for the manufacture of turbomachine blades. In fact, a retraction is observed that can reach up to 15% of a dimension of the blade. Yet it is important to accurately control the dimensions of this type of part. Moreover, the thermal variations to which the blade is subjected during manufacture can cause deformations or cracks. This is all the more significant in that the blades are generally asymmetrical and have thicknesses at certain places which are up to 3.5 times greater than the thickness at another place in the blade.

One object of the invention is therefore to make the manufacture of turbomachine blades, particularly by the injection of metal powder, easier and more reliable.

DISCLOSURE OF THE INVENTION

To this end, a manufacturing method for a turbomachine blade is provided according to the invention, in which:

a part is manufactured comprising an air flow path zone and a layer covering the zone, the layer having cavities forming a periodic pattern, the manufacture taking place by injection of a mixture comprising a binder and a powder;

the majority of the binder is eliminated from the part;

sintering of the part is carried out; and the layer is eliminated from the part to obtain the blade.

The layer thus allows preventing the appearance of cracks linked to the injection step, but also avoiding the appearance of deformation phenomena such as slump, torsion, bending, buckling and mechanical stresses linked to the steps of sintering and machining. The invention thus allows the manufacture of elongate, particularly asymmetrical parts with complex geometry, and to controlling the dimensions of the part. It allows production at high rates. Providing cavities in the layer has the advantage of economizing material and therefore reduction the costs of manufacture. Finally, the cavities reduce the risk of pullout during removal from the mold.

The manufacturing method according to the invention can also have at least one of the following features:

the cavities are in a staggered arrangement;

the cavities form at least one line of identical cavities, the line being parallel to a length of the air flow path zone;

the cavities form at least one first line and one second line, those of the first line being identical to one another, those of the second line being identical to one another, finally those of the first line being different from the cavities of the second line;

the cavities of the first line have a profile having a different orientation from the cavities of the second line;

each cavity has a closed profile;

each cavity has a profile which has at least one axis of symmetry;

each cavity has a hexagonal profile;

each cavity is configured so that the cavity can be described by a parametric surface excluding any singular point;

each cavity has lateral faces having zones coupling with a cavity bottom and with an outer face of the layer, the coupling zones having a groove with a radius comprised between 0.2 mm and 1 mm;

the cavities are arranged so that a distance between two adjacent cavities is greater than or equal to 3 mm, for example greater than or equal to 6 mm; and the cavities extend in a major portion of the layer.

It is possible to provide that the cavities extend over the entire thickness of the layer.

It is possible to provide that the layer extends over the entire air flow path zone.

According to one embodiment, the layer covers a lower surface of the air flow path zone.

It is possible to provide that the thickness of the layer is uniform.

This favors uniform de-binding of the part.

According to one embodiment, the layer is placed directly supported on a support, particularly during the sintering step.

Here then the layer serves as an integrated support of the part to avoid its deformation, particularly its slumping, during sintering.

It can be provided that the part comprises a root, the layer forming a plane conflated with an edge of the root.

According to one embodiment, at least one machining operation is carried out so as to make a thickness of the layer uniform.

Thus the layer serves here as reinforcement during machining by allowing stiffening the blade which is exposed to large deformations during the roughing operation involving high cutting forces.

According to one embodiment, the layer and an upper face are machined in several passes each having a depth comprised between 0.2 mm and 1 mm and/or a step width comprised between 0.1 mm and 10 mm.

These machining parameters during the finishing operation allow satisfying the aeronautical-field-compliant geometric specifications and the complexity of the profile shape of the air flow path zone.

Also provided according to the invention is a part comprising:

a turbomachine blade, the blade comprising an air flow path zone, and a layer distinct from the blade, extending over the air flow path zone and having cavities forming a periodic pattern.

This part constitutes the intermediate product obtained during the implementation of the method of the invention, before the elimination of the layer.

According to one embodiment of this part, the material used is an alloy of titanium and of aluminum.

Also provided according to the invention is a turbomachine blade, particularly of an aeronautical turbine engine, the blade comprising an air flow path zone, the blade resulting from the implementation of a method according to the invention.

Such a blade can have, in the macroscopic plane, a shape and dimensions identical to those of a blade manufactured by means of a prior art method. However, it is differentiated from it in its microscopic structure. Thus, it has a greater average grain size than that of the blade obtained by a method of the prior art and it offers better resistance to creep.

In addition, a turbomachine is provided according to the invention comprising at least one blade according to the invention.

DESCRIPTION OF THE FIGURES

We will now present an embodiment of the invention by way of a non-limiting example supporting the drawings in which.

We will present a mode of implementation of the manufacturing method according to the invention for producing a turbomachine blade.

In a first step, an intermediate part 4 is manufactured comprising a blade. This part is illustrated in FIGS. 1 to 5.

The part and the blade thus comprise a root 6, a tip 8 and an airfoil or air flow path 10 extending between the root and the tip.

Figure 2:
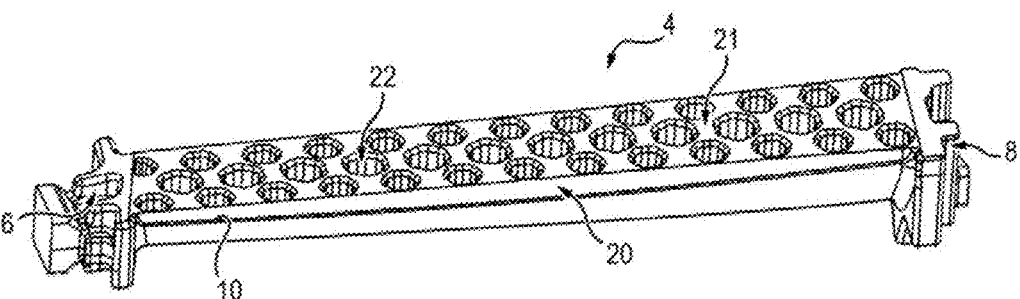
Figure 3:
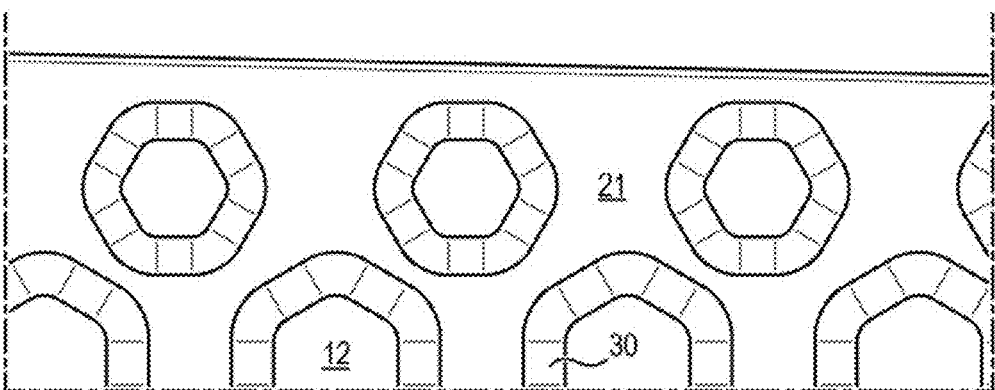
FIG. 3 is a larger-scale view of the lower side of the part of FIGS. 1 and 2.
Figure 4:
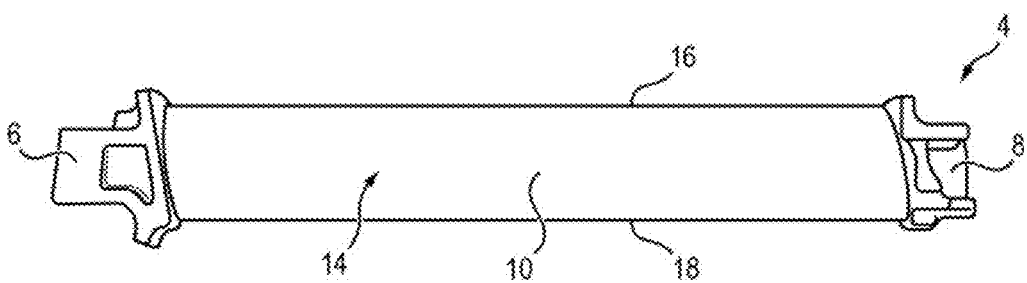
FIGS. 4 and 5 are upper side views of the same part.
Figure 5:
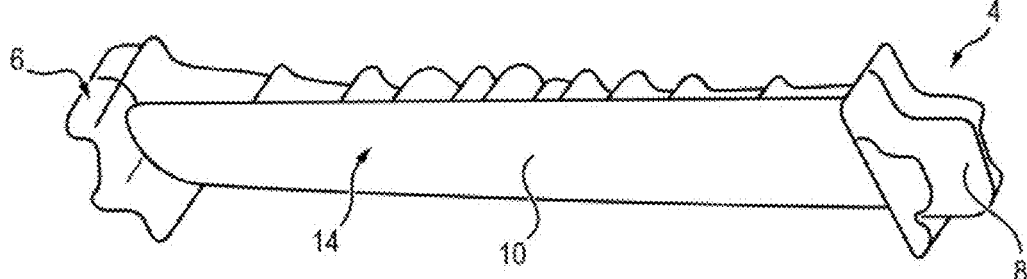
Figure 14:
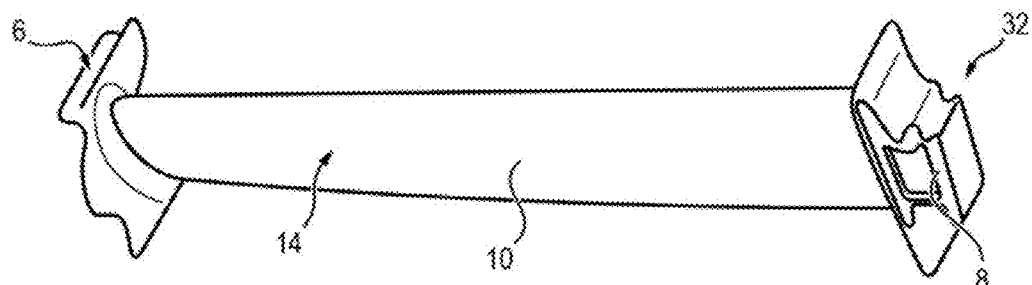
FIG. 14 is a view similar to FIGS. 4 and 5 showing the blade obtained starting from this intermediate part.

The air flow path zone 10, visible in FIGS. 2 and 4, has two main faces, namely a lower surface face 12 visible in FIG. 3 et and an upper surface face 14, visible in FIGS. 4, 5 and 14. The two faces are each delimited by a leading edge 16 and a trailing edge 18 forming the two longitudinal edges of the blade. Each main face 12, 14 extends from the root to the tip.

As illustrated in FIG. 2, the part 4 comprises a layer 20 extending over the air flow path zone, in this case on the lower surface face 12. The layer has a uniform thickness all along the layer, the minimum value of which amounts to 2 mm at the tip, in the present example.

Regarding the Cavities

Figure 1:
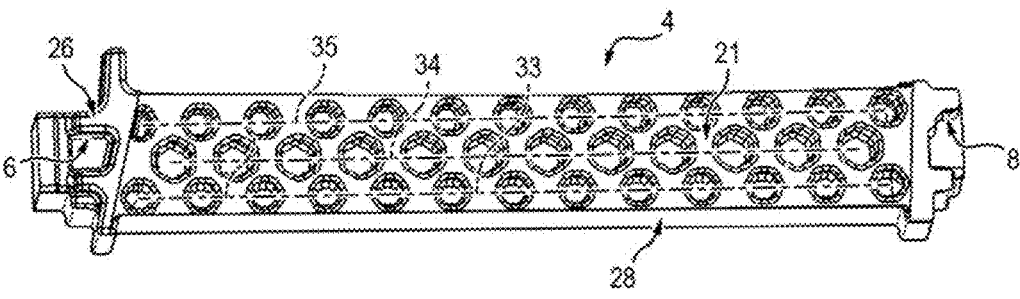
FIGS. 1 and 2 are lower side perspective views of an intermediate part obtained in a mode of implementation of the method of the invention.

The layer has cavities 22, visible in FIGS. 1 to 3, open on the side of an outer face 21 of the layer 20 opposite to the air flow path zone 10. Each cavity extends over the entire thickness of the layer. The cavities 22 extend over the majority of the layer 20 and it extends over the entire air flow path 10.

This layer forms a plane conflated with the edge of the root 26 visible in FIG. 1.

In order to facilitate the manufacture of the mold and the injection step, each cavity 22 has a geometry that can be described by a parametric surface, excluding any singular point, the profile of which is closed and has at least one axis of symmetry. In one embodiment illustrated in FIG. 3, the cavities 22 have a hexagonal shape, the vertices of which are rounded. In another embodiment it can be contemplated that the cavities 22 have a profile having a cylindrical or elliptical shape.

Here the cavities 22 form a periodic pattern. What is meant by that is that the pattern is reproduced identically along one or more lines in a plane parallel to a longitudinal direction of the layer and parallel to the width of the layer.

In this case, the cavities 22 form three lines of identical cavities 33, 34, 35, visible in FIG. 1, each line being parallel to a length of the air flow path zone 28. More precisely, the cavities 22 form three lines, namely the first, second and third lines. The cavities of the first line 33 are identical to one another. The cavities of the third line 35 are identical to one another and to those of the first line 33. In addition, the cavities of these two lines all have the same orientation. In this case, one side of the hexagon is parallel to the leading 16 and trailing 18 edges. They are therefore the image of one another by a translation.

The cavities of the second line 34 are identical to one another and different from the cavities of the first and third line, in this case larger than these. The cavities of the second line all have the same orientation. They are therefore the image of one another by a translation. But they do not have the same orientation as those of the two other lines. In this case, two edges of the hexagon are parallel to the leading and trailing edges. They are therefore images of the first and third lines by indirect similitude.

The cavities are in a staggered arrangement.

To limit the risks of pullout and of cracking during the ejection of the intermediate part 4 from the mold, it is preferable that two adjacent cavities 22 be at a minimum distance of 3 mm, the value taken for the example illustrated in FIG. 3.

Each cavity 22 has lateral faces, six in number, having zones coupling with a bottom of the cavity and with the outer face 21 of the layer 20, the coupling zones having a groove 30 having a radius comprised between 0.2 mm and 1 mm. The groove is convex at the outer face and concave at the bottom.

Regarding the Steps of the Method

Obtaining the Intermediate Part

In this case, manufacture implements an injection of metal powder.

In a first step, injection molding is therefore carried out starting with a mixture of a metal powder and an organic binder. Here the metal powder is an alloy of titanium and aluminum such as for example Ti-48Al-2Cr-2Nb (in atom %), commonly called TiAl 48-2-2. Thus a blank of the part of FIGS. 1 to 3 is obtained, namely the blade equipped with the layer. This is the "green." In this blank, the powder is held in place by the binder.

This binder is then withdrawn during the de-binding operation, which gives the "brown" part. In this part, nearly all the binder has been removed and it is composed of almost 40% air, and is held together only by the remainder of the binder.

It is then sintered, a step during which it is subjected to a temperature approaching the melting point of the powder, for example greater than 1200° C.

After this operation a "grey" part is obtained, composed only of the material of the powder and having shrunk relative to the molded volume due to the spaces left by the binder.

This part 4 is manufactured in a single block. During the operations of de-binding and sintering, the part is arranged supported directly on a flat support, the outer face 21 of the layer 20 being located at the lower portion and the upper surface face 14 turned upward. This layer is therefore in contact with the flat support. The latter provides a local support to the air flow path zone 10.

This layer forms a support but also a stiffener that allows preserving the shape of the part and its integrity during these operations, in particular during the sintering, then the cooling.

At the conclusion of this first manufacturing phase, a part 4 is therefore obtained forming an intermediate product consisting of the blade 34 and of the layer 20 as illustrated in FIGS. 1 to 5.

Machining

The layer is then eliminated from the air flow path zone by two machining phases, 200 and 300.

Figure 6:
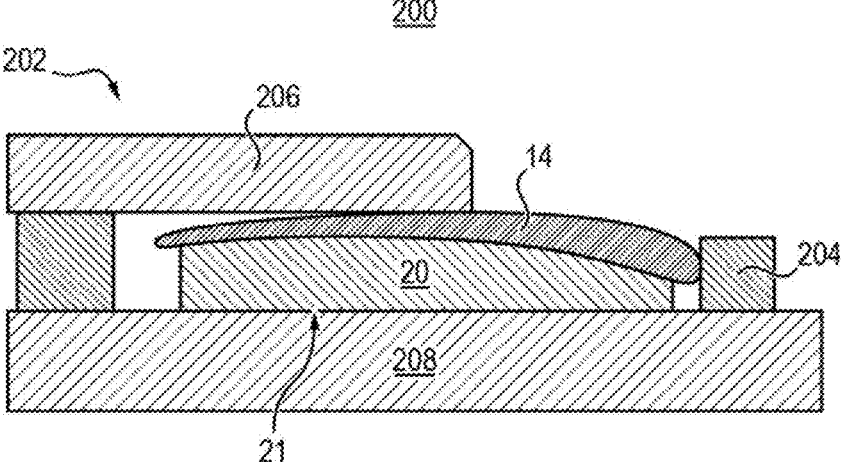
FIGS. 6 and 7 illustrate the positioning and the retention in position of the intermediate part in its workpiece holder for the first machining phase.
Figure 7:
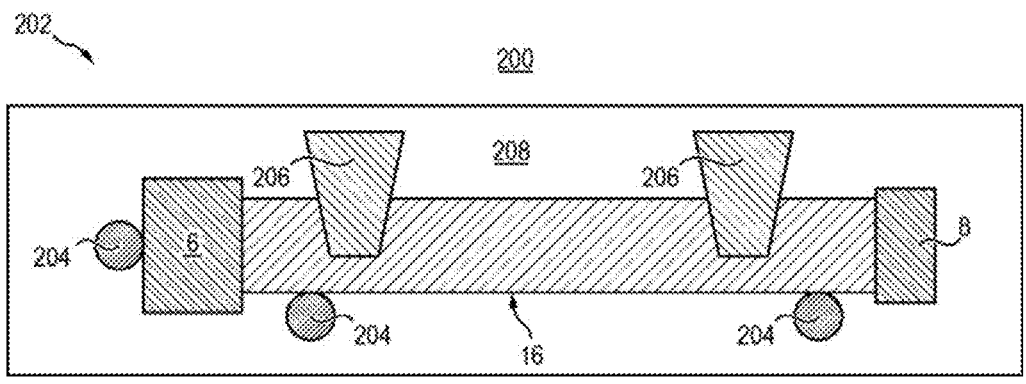

To this end, the positioning and retention in position of the part is accomplished in a workpiece holder 202 for the machining phase 200. FIG. 6 shows a front view of a section of the intermediate part taken in its workpiece holder 202, and FIG. 7 the top view of the part in the same configuration. The outer face 21 of the layer 20 is placed directly supported on a table 208. Thus, choosing the outer face of the layer as a reference for the positioning, covering 80% of the intermediate part, allows avoiding the dispersions linked to possible shape errors generated by the method and contributes robustness to the clamping. Three point contacts 204, which can be embodied by pins or other supports, are placed, namely one against the root 6 in the longitudinal direction and two against the leading edge 16 in the width direction. In other embodiments, the first stop can be placed at the tip 8, the lower surface 14 or the upper surface 16 and the two others against the trailing edge 18. Two flanges 206 placed at the upper surface 14 complete the rigid retention in position of the intermediate part on the table by the width and by the top against the upper surface face. The number of direct contacts of the flange with the upper surface can be singular, or greater than or equal to two. The table, the stops and the flanges form the workpiece holder. Moreover, this workpiece holder will be disengaged on the side of the root 6 and tip 8 in order to open the accessibility of milling tools to all these zones.

In this configuration, the machining of the root 6 and of the tip 8, which will serve as the baseline for the tooling and for the clamping zone for the second machining phase, is carried out.

Figure 8:
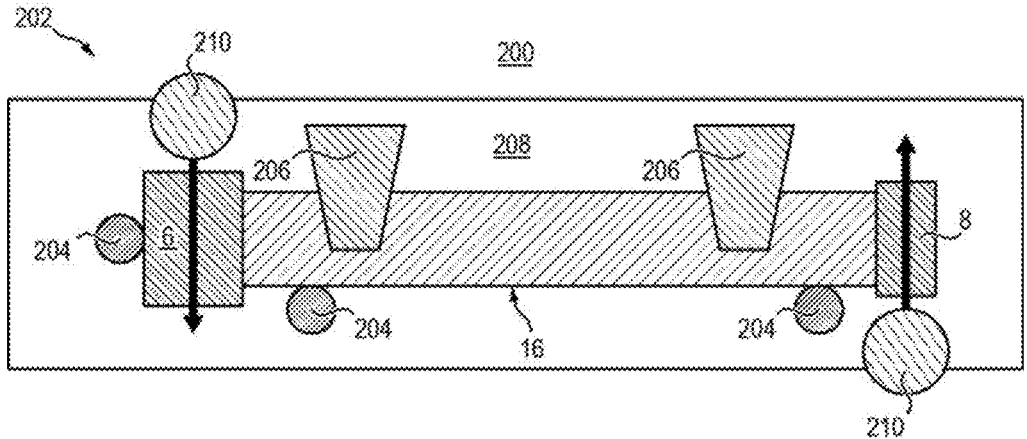
FIGS. 8 and 9 illustrate the trajectory followed by the milling cutter for the first machining phase.
Figure 9:
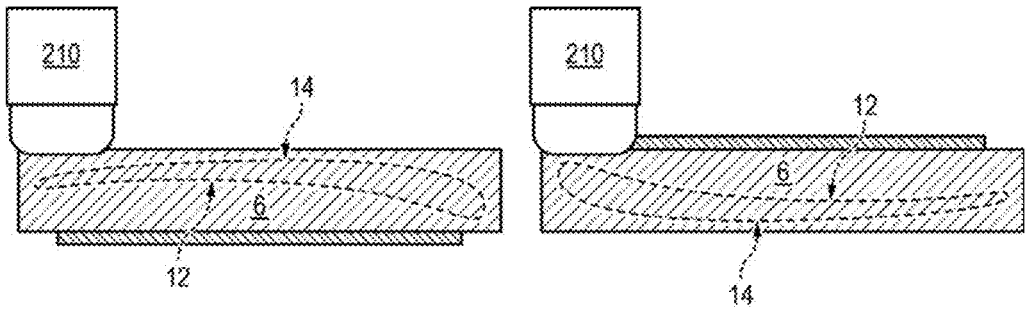

The machining trajectory for the phase 200 is illustrated in top view of the intermediate part in FIG. 8, and in front view of a section of the intermediate part in the two parts of FIG. 9. The machine tool used comprises five or six axes and the machining program conforms to the following operations:

1a. a surface milling cutter 210 establishes at the root 6, then at the tip 8, a first plane on the side of the upper surface 14, 1b. the workpiece holder 202 turns, and 1c. the second plane is established at the tip 8, then the root 6, on the lower surface 12 profile side.

In another embodiment, the machine tool comprises only three axes, which does not allow the rotation of the workpiece holder 202. Thus, to be able to machine both sides, it is necessary to remove the part and turn it over. An additional machining phase is therefore to be provided for, separating operations (1a) and (1c).

Figure 10:
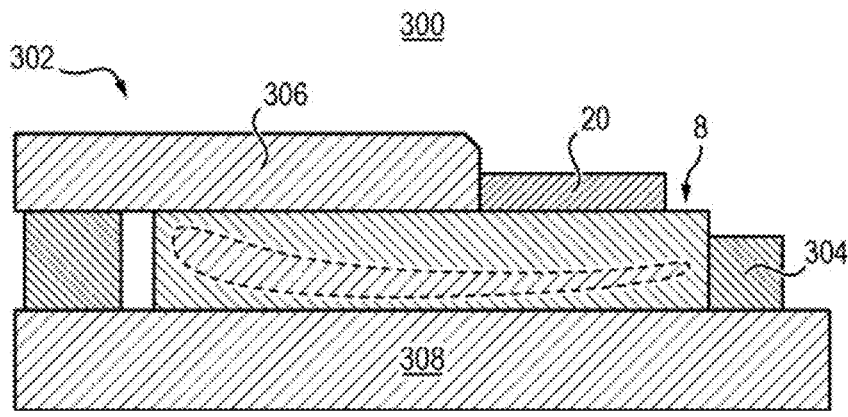
FIGS. 10 and 11 illustrate the positioning and the retention in position of the intermediate part in its workpiece holder for the second machining phase.
Figure 11:
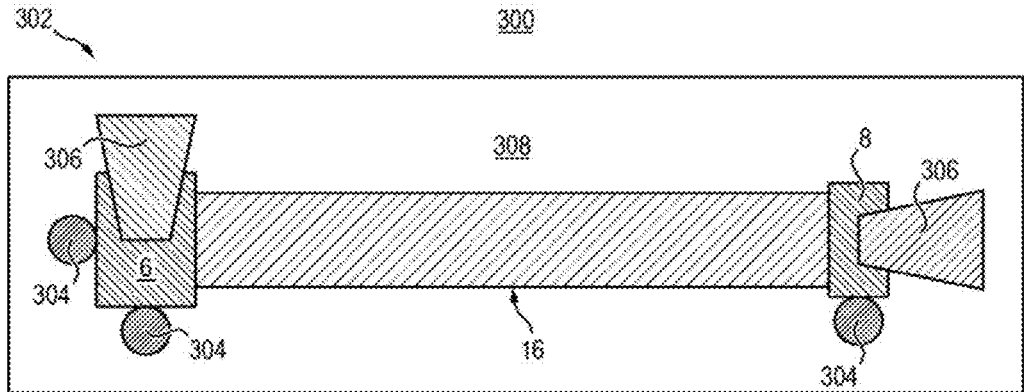

Next, the positioning and the retention in position of the part in another workpiece holder 302 is accomplished for the second machining phase 300, as illustrated in FIG. 10, showing the front view of a section of the intermediate part taken in its workpiece holder 302, and FIG. 11, showing the top view of the part taken in its workpiece holder 302. The root 6 and the tip 8 are placed supported directly on the table 308, forming a contact zone that is sufficiently accurate to satisfy the geometric tolerances during adjustment and clamping as well as the compatibility of the cutting forces necessary for the second machining phase 300. Three point contacts 304, which can be embodied by pins or other supports, are placed, namely two against the root 6 and one against the tip 8. Two flanges 306 placed at the root 6 and the tip 8 ensure the rigid retention in position of the intermediate part. This time the rigid retention occurs exclusively by the root and the tip, leaving the air flow path zone 10 accessible for machining, the workpiece holder being disengaged in this zone.

Figure 12:
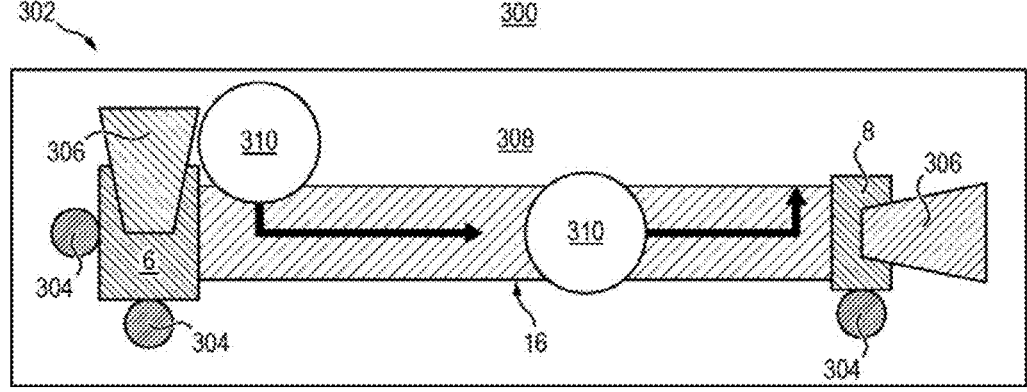
FIGS. 12 and 13 illustrate the trajectory followed by the milling cutter for the second machining phase.
Figure 13:
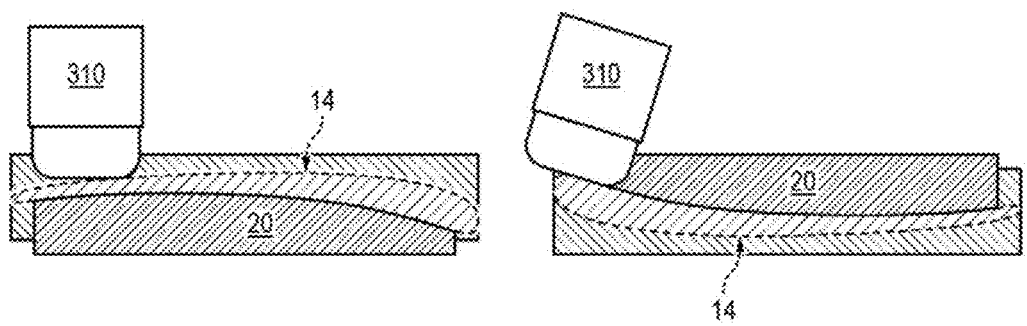

The machining trajectory for the phase 300 is illustrated in top view of the intermediate part in FIG. 12, and in front view of a section of the intermediate part in FIG. 13. The machine tool used comprises five or six axes and the machining program conforms to the following operations:

2a. a two-size milling cutter 310 carries out a roughing operation on the layer 20 of the intermediate part to bring this face to a thickness identical to that of the upper surface 14 side which can amount to 2 mm, 2b. The milling cutter carries out a finishing operation on this same lower surface 16 face progressing along the part by spiral or helical sweeping movements until the final profile or after 20 to 10 successive passes, 2c. the workpiece holder 302 turns, and 2d. The milling cutter carries out a finishing operation on the upper side 14 face, progressing along the part by spiral or helical sweeping movements until the final profile or being able to perform 2 to 10 successive passes.

This order of the operations allows carrying out the roughing operation to a maximum of material, thus sufficiently stiffening the intermediate part subjected to large cutting forces linked to the large volume of material of the layer 20 and to the discontinuity of the layer due to the presence of the cavities 22.

The passes preferably produce a removal of material having a value comprised between 0.2 mm and 1 mm, and the step width has a value comprised [between] 0.1 and 10 mm depending on roughness, the heights of the desired crests and the geometry of the milling tools.

In another embodiment, the machine tool comprises only three axes, which does not allow the rotation of the workpiece holder 302. Thus, to be able to machine both sides, it is necessary to remove the part and turn it over. An additional machining phase is therefore to be provided for, separating operations (2a), (2b) from operation (2c).

The cutting tools of the milling cutters 210, 310 used can have the following features:

the material is a carbide of the "micro grain" type in a single block or as an applied wafer;

a coating of any type is deposited; and the cutting angle is comprised between −5° and +10°.

It can be provided that the cutting speeds are comprised between 20 m/mm and 100 m/mm and that the advance is comprised between 0.01 mm and 1 mm.

Soluble or complete oils can be used under a pressure which can be comprised between 5 bars and 150 bars (one bar amounting to $10^5$ Pa).

A lubricant that is micro-sprayed, using $CO_2$ or nitrogen, can also be used.

A part is then obtained consisting only of the blade 32 illustrated in FIG. 14. The blade comprises the root 6, the tip 8 and the air flow path zone 10. The two faces, lower surface 12 and upper surface 14, are smooth.

In the blade 32, the air flow path zone 10 has a thickness that is smaller than that of the root 6 and the tip 8. This difference can have a great impact during cooling and shrinkage of the part in the absence of the layer 20. The layer and its cavities 22 are arranged and dimensioned, as explained above, in order to reduce this ratio. Overall, taking into account the location of the massive zones of the part 4 allows distributing the material during design in order to avoid differences of thickness that are too great over the entire part.

Moreover, in the absence of support by the layer 20, the air flow path zone 10 would slump during manufacture. That is the reason for which the layer is made thicker in the air flow path zone, in order to support it. The periodical pattern of the cavities 22 allows reducing the risks of different types of deformation to which the blade would otherwise be exposed during manufacture, while still minimizing costs.

In addition, it will preferably be ensured that the injection stresses and the phenomena of segregation, of core porosity and internal stresses generated and detected during sintering are taken into account.

Figure 15:
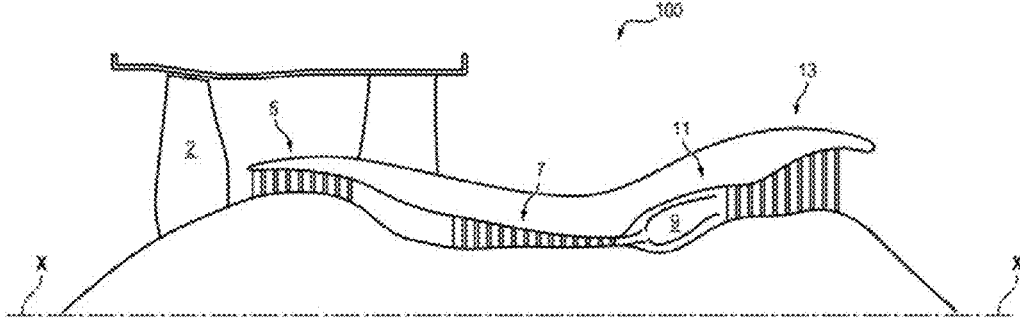
FIG. 15 is a half-section view of an airplane turbojet incorporating a blade of this type.

In the present example, the blade 32 is intended to form part of an airplane turbojet 100, forming here a double flow and two-spool turbomachine like that illustrated in FIG. 15. The turbomachine has a main axis X-X which serves as the axis of rotation of the rotor relative to the stator.

It comprises, from upstream to downstream, hence from left to right in FIG. 15, a fan 2, a low-pressure compressor 5, an intermediate-pressure compressor, a high-pressure compressor 7, a combustion chamber 9, a high-pressure turbine 11 and a low-pressure turbine 13. These elements, with the exception of the fan, form a central portion of the turbojet. Their parts that are movable in rotation around the axis X-X form the rotor.

The high-pressure compressor 7, the combustion chamber 9 and the high-pressure turbine 11 form a high-pressure spool, which, jointly with the low-pressure compressor 5 and the low-pressure turbine 13, define a main air flow path. A nacelle surrounds the fan 2 and the central portion so as to form a fan compartment and define a secondary air flow path.

The turbines 11, 13 comprise blades 32 manufactured by means of the invention.

The invention is applicable to other manufacturing technologies, for example the pressing of feedstock and the compacting of feedstock.

The manufacture could also occur according to the technique of printing by binder projection (or binder jetting). The latter is an additive manufacturing method which operates by projecting binder onto a powder. An automated roller distributes a thin layer of powder onto a manufacturing tray. A printing head applies a liquid binder onto the powder, thus creating layer of the object. Then, the printing platform bearing the tray drops slightly to allow the addition of a new layer of powder. The method is repeated until the object is created. The excess powder is then aspirated and the object is dusted by means of compressed air. Then the printed part is placed in an oven for baking or sintering. Finally, a finishing treatment can improve the condition of the printed part. As before, the layer of the intermediate product thus produced is eliminated to obtain the blade itself.

The invention applying to the manufacture of metal parts, particularly by the method of injection of a mixture comprising a binder and a powder, it can be used in all technical fields.

The invention claimed is:

1. A method for manufacturing a turbomachine blade, the method comprising:

manufacturing a part by injecting a mixture comprising a binder and a powder, the part comprising:

a root, a tip, an air flow path zone extending between the root and the tip, and a layer covering the zone, the layer having cavities forming a periodic pattern, the layer extending continuously from the root to the tip, wherein:

the cavities form at least one first line and one second line, the cavities of the at least one first line being identical to one another, the cavities of the one second line being identical to one another, each of the cavities has a hexagonal profile and a closed profile, and the cavities of the at least one first line have a profile having a different orientation from the cavities of the one second line;

eliminating from the part a majority of the binder;

sintering the part; and eliminating the layer from the part to obtain the turbomachine blade.

2. The method according to claim 1, wherein the cavities are open on an outer face of the layer opposite to the air flow path zone.

3. The method according to claim 1, wherein the cavities are in a staggered arrangement.

4. The method according to claim 1, wherein the cavities form at least one line of identical cavities, the at least one line being parallel to a length of the air flow path zone.

5. The method according to claim 1, wherein each cavity of the cavities has a profile which has at least one axis of symmetry.

6. The method according to claim 1, wherein each cavity of the cavities has a plurality of lateral faces, each lateral face of the plurality of lateral faces having a plurality of zones coupling with a cavity bottom and with an outer face of the layer, the plurality of zones having a groove with a radius comprised between 0.2 mm and 1 mm.

7. The method according to claim 1, wherein the cavities are arranged so that a distance between two adjacent cavities of the cavities is greater than or equal to 3 mm.

8. The method according to claim 1, wherein the cavities extend in a major portion of the layer.

9. The method according to claim 1, wherein the cavities extend over an entire thickness of the layer.

10. The method according to claim 1, the part comprising a root, the layer forming a plane conflated with an edge of the root.

11. The method according to claim 1, further comprising performing at least one machining operation so as to make a thickness of the layer uniform.

12. The method according to claim 1, wherein the layer and an upper surface face are machined in several passes, each having a depth comprised between 0.2 mm and 1 mm.

13. The method according to claim 1, wherein the layer and an upper surface face are machined in several passes, each having a step width comprised between 0.1 mm and 10 mm.

14. A part comprising:
a turbomachine blade, the blade comprising an air flow path zone, and
a layer that is connected to an outer surface of the turbomachine blade and configured to be removed from the outer surface of the turbomachine blade, and extends over the air flow path zone and having cavities forming a periodic pattern,
wherein:
the cavities form at least one first line and one second line,
the cavities of the at least one first line are identical to one another,
the cavities of the one second line are identical to one another,
each of the cavities has a hexagonal profile and a closed profile, and
the cavities of the at least one first line have a profile having a different orientation from the cavities of the one second line.

15. A turbomachine blade of an aircraft turbine engine, the turbomachine blade comprising an air flow path zone and resulting from an implementation of the method according to claim 1.

16. A turbomachine comprising at least one turbomachine blade according to claim 15.

* * * * *